April 21, 1970 N. O. ROSAEN 3,507,391
FILTER DEVICE
Filed Feb. 18, 1969
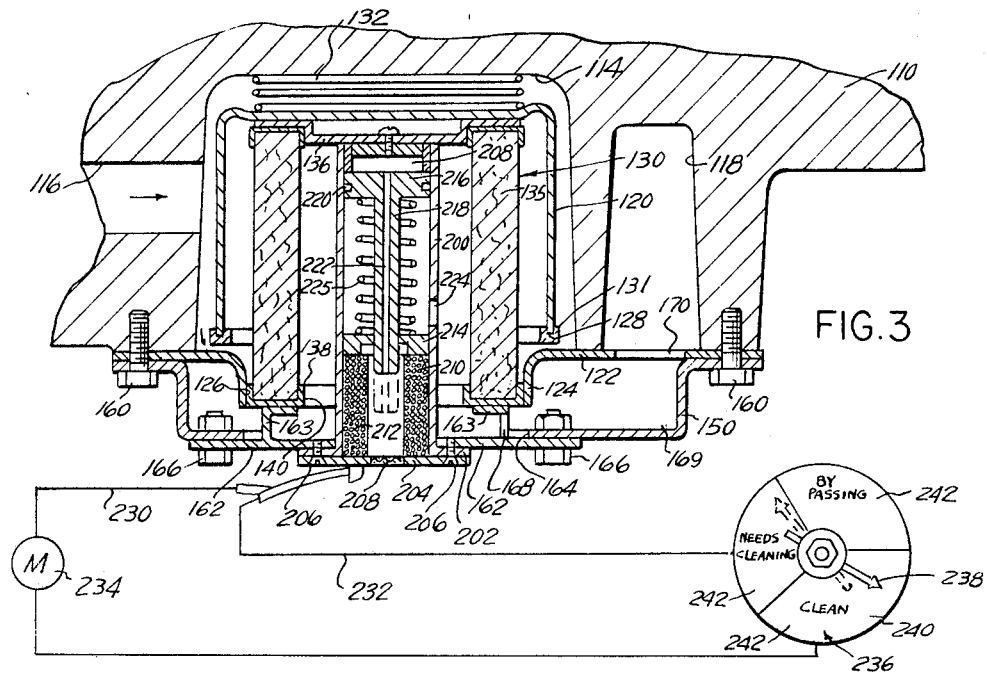
FIG. 3
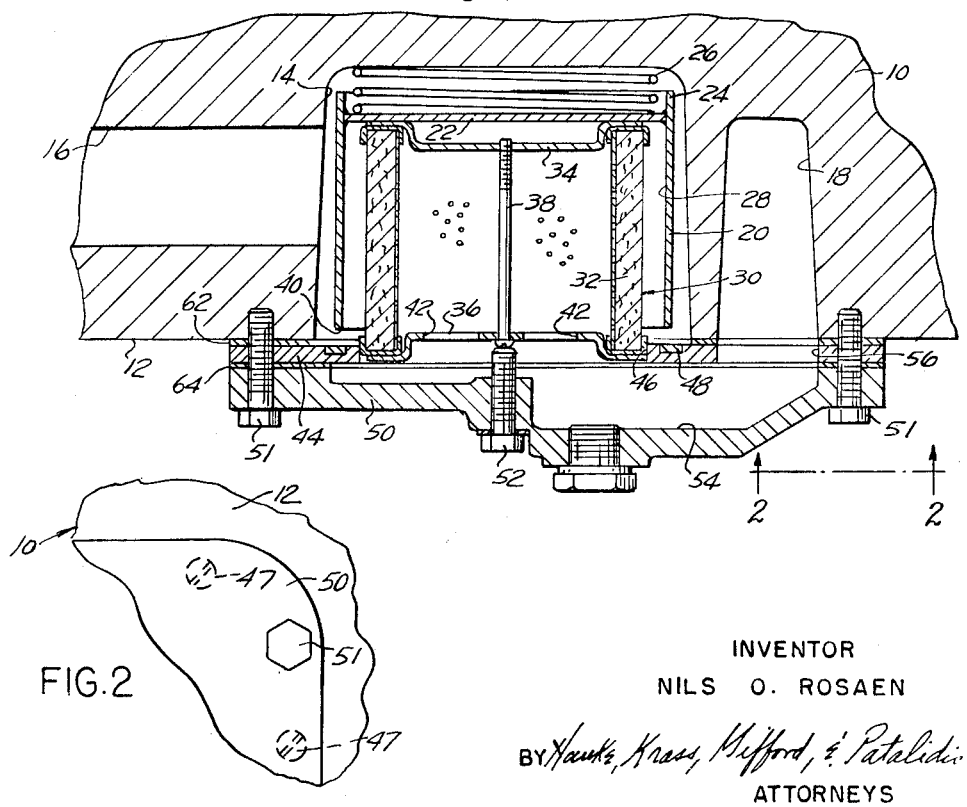
FIG. 1
FIG. 2
INVENTOR
NILS O. ROSAEN
BY Hauke, Krass, Gifford, & Patalidis
ATTORNEYS

United States Patent Office 3,507,391
Patented Apr. 21, 1970

3,507,391
FILTER DEVICE
Nils O. Rosaen, Bloomfield Hills, Mich., assignor to Parker-Hannifin Corporation, Cleveland, Ohio, a corporation of Ohio
Continuation-in-part of application Ser. No. 696,883, Jan. 10, 1968. This application Feb. 18, 1969, Ser. No. 800,136.
Int. Cl. B01d 27/00, 27/10, 35/12
U.S. Cl. 210—90                                                    13 Claims

ABSTRACT OF THE DISCLOSURE

A fluid filter device adapted to be mounted within a chamber formed in the flat undersurface of a housing and to be held in position by a cover assembly which maintains a valve member in an open position when the filter element is in place to permit fluid flow through the filter element and which permits the valve to close when the filter element is removed so that the filter element can be removed with a minimum of fluid loss.

CROSS-REFERENCE TO RELATED APPLICATION

The present application is a continuation-in-part of application Ser. No. 696,883 filed Jan. 10, 1968 and now abandoned.

BACKGROUND OF THE INVENTION

Field of the invention

The present invention relates to fluid filter devices and more particularly to such a filter device having a filter element removable from the bottom of the device and valve means operable in one position to permit fluid flow through the filter element and in another position to close off communication between the inlet to the device and the filter chamber, and a cover assembly for such a device which maintains both the filter element and the valve means in place and which permits the valve means to move to the closed position upon removal of the filter element to permit the filter element to be removed for cleaning or replacement with a minimum of fluid loss.

DESCRIPTION OF THE PRIOR ART

Heretofore a number of fluid filter devices have been provided for use in pressure systems or in systems where the filter device is disposed below the fluid level. A number of these devices have been provided with means for automatically moving to a position upon removal of the filter element to isolate the filter chamber from the inlet so that the filter element can be removed without draining the system. In many of these, however, repair or replacement of the valve assembly has been difficult and upon malfunction of the valve means it has been necessary in many of these devices to completely disassemble the filter device after disconnecting it from the fluid system to make the necessary repairs.

SUMMARY OF THE PRESENT INVENTION

The present invention provides such a filter device including an essentially two piece cover assembly with the inner cover member operable to mount the valve means in place and the outer cover retaining the filter element in position. Mounting the outer cover member in position causes the valve means to be engaged and to be urged to a position opening fluid flow through the device. Removal of the cover and filter element permits the valve means to close and to thereby isolate the filter chamber from the inlet so that the element can be removed to be cleaned or replaced with a minimum loss of system fluid. Replacement or maintenance of the valve means can be readily accomplished by removing the inner cover member to permit removal of the valve means from the device.

In one embodiment of the invention electrically actuated indicating means indicate a clogged condition of the filter element exteriorly of the device so that the element can be replaced or cleaned when this is necessary.

DESCRIPTION OF THE DRAWINGS

A better understanding of the present invention will be achieved upon reference to the accompanying description of several preferred embodiments thereof. The description makes reference to the accompanying drawings in which like reference characters refer to like parts throughout the several views and in which:

FIGURE 1 is a cross sectional view of one preferred embodiment of the present invention;

FIGURE 2 is a fragmentary elevational view substantially as seen from lines 2—2 of FIGURE 1; and FIGURE 3 is a view similar to FIGURE 1 but illustrating another preferred embodiment of the present invention and illustrating an electrical circuit for indicating means with portions of the circuit shown schematically.

DESCRIPTION OF SEVERAL PREFERRED EMBODIMENTS

Now referring to the drawings for a more detailed description of the present invention, one preferred filtering device is illustrated in FIGURES 1 and 2 as being mounted in a housing 10. The housing 10 can be a portion of a machine or the like utilizing the fluid filtering system and only a portion thereof is illustrated in the drawing. The housing 10 is preferably provided with at least one flat surface 12 having a substantially cylindrical recess 14 extending upwardly therefrom. An inlet passage 16 connects laterally to the recess 14 and is adapted for connection to a source of fluid (not shown). An outlet passage 18 extends from the surface 12 adjacent the recess 14 and is adapted for connection to a fluid user (not shown). A cup-shaped housing member 20 is adapted to be carried in the recess 14 and is provided with a closed inner end 22 and an upwardly extending peripheral portion 24 which forms the seat for one end of a spring 26 urging the housing 20 downwardly in the recess 14. The interior of the housing member 20 forms a substantially cylindrical filter chamber 28 and a filter assembly 30 is adapted to be disposed within the filter chamber 28.

The filter assembly 30 preferably comprises a substantially cylindrical filter element 32 disposed intermediate a pair of flanged end members 34 and 36. The assembly is held together by a screw 38 extending between the flanged members 34 and 36. The element is dimensioned such that when it is mounted in place, in a manner which will be described in greater detail below, the flanged member 34 bears against the inner surface of the closed end 22 of the housing member 20 to urge the housing member 20 against the force of the spring 26 to a position in which the lower peripheral edge 40 of the housing 20 is spaced inwardly from the surface 12 as can best be seen at FIGURE 1. The flanged member 36 is provided with a plurality of annular openings 42 so as to permit axial fluid flow from the interior of the filter element 32.

A plate 44 having a central opening 46 is mounted by screws 47 (FIG. 2) to the surface 12 to encompass the entrance to the recess 14. The diameter of the opening 46 is sufficient to permit axial passage of the filter assembly 30 so that the assembly 30 can be removed through the opening 46 but it is too small to permit passage of the housing member 20 therethrough. The inner surface of the plate 44 carries an annular seal member 48 disposed to engage the lower peripheral edge 40 of the housing 20 upon removal of the element 30. A cover member 50 overlies the plate member 44 to close the opening 46 and is held in place by a plurality of fasteners 51 which also extend through the plate member 44. A screw 52 carried by the cover member 50 engages the head of screw 38 to provide a means for holding the filter assembly in the desired axial position. The position of the assembly can be adjusted by adjusting the screw 52. The interior of the cover member 50 is enlarged on one side to provide an outlet chamber 54 registering with the interior of the filter element 30 through the passages 42 and the opening 46 and further registering with the outlet passage 18 through an opening 56 provided in the plate member 44. Gaskets 62 and 64 are preferably mounted on each side of the plate member 44 as shown.

As the invention has thus far been described it is apparent that with the filter assembly 30 mounted in the position illustrated in FIGURE 1 fluid flow will normally be from the inlet passage 16 around the lower outer edge 40 of the housing member 20 radially inwardly through the filter element 32 and axially downwardly through the ports 42, the outlet chamber 54 and upwardly to the outlet passage 18.

When the filter element 32 becomes clogged the assembly 30 can be removed for cleaning or replacement by removing the threaded fasteners 51 to remove the cover member 50. Removal of the cover member 50 does not affect the plate member 44 for it remains mounted to the housing 10 by the threaded fasteners 47. Once the cover member 50 has been removed the filter assembly 30 can be removed axially through the central opening 46 of the plate member 44. Removal of the filter assembly 30 permits the spring 26 to urge the housing 20 downwardly so that the lower peripheral edge 40 acts as a valve and closes against the gasket 48 to seal the interior of the housing and thereby preventing fluid from draining from the system by way of the opening 46.

This construction permits the filter element 32 to be replaced or cleaned without requiring that the system from the inlet side thereof be drained of fluid. Without such a valve means as afforded by the edge 40 and the gasket 48 and with the element 32 mounted as shown removal of the cover 50 would automatically drain much of the fluid from the system so that resumption of operation of the system would be difficult.

FIGURE 3 illustrates another preferred embodiment of the present invention substantially similar to the embodiment described in FIGURES 1 and 2 but including an indicating means for indicating the condition of the filter element.

As illustrated in FIGURE 3 a housing 110 is provided with an inlet passage 116 and an outlet passage 118 and a substantially cylindrical recess 114. The filter device 110 further comprises a substantially cup-shaped housing member 120, a plate member 122 having a downwardly depending annular flange 124 defining a central opening 126. The housing member 120 has a lower annular edge 128 of a greater diameter than the opening 126 and which carries sealing means 131. The housing 120 is mounted within the chamber 114 and is normally held in position by a filter assembly 130 and a spring 132, with the sealing means 131 disposed above the plate member 122 to normally permit fluid flow from the inlet 116 to the interior of the housing member 120. A cover member 150 is mounted to the housing 110 by a plurality of fasteners 160 in the manner described with respect to FIGURES 1 and 2, and is provided with a central support member 162 which closes an opening 164 formed in the cover 150 and which has an inwardly extending flanged portion 163 providing the means for positioning the filter assembly 130 within the cup-shaped housing member 120. The member 162 is mounted to the cover 150 by threaded fasteners 166 and the opening 164 substantially coincides with the opening 126 so that upon removal of the support member 162 the filter assembly 130 can be axially removed from within the cup-shaped housing 120. The support member 162 is provided with a plurality of annularly spaced openings 168 which afford communication between the interior of the filter assembly 130 and an outlet chamber 169 formed intermediate a portion of the cover 150 and of the plate 122. An opeing 170 in the plate 122 provides communication between the outlet chamber 169 and the outlet passage 18.

Thus, it is apparent that as the invention has thus far been described removal of the filter assembly 130 permits the spring 132 to urge the cup-shaped housing 120 axially downwardly so that the sealing means 131 engages the upper surface of the plate 122 to form a valve means closing fluid flow from the inlet passage 116 to the interior of the housing member 120.

The filter assembly 130 preferably comprises a substantially cylindrical filter element 135 sandwiched between a pair of flanged cap members 136 and 138. The flanged member 138 is provided with a central opening 140 so that normal fluid flow is from the inlet 116 past the lower edge 128 of the housing member 120, radially inwardly through the filter element 135 and axially downwardly through the opening 140 to the chamber 168, the opening 170 and into the outlet chamber 118.

A hollow cylindrical element 200 having an annular flange 202 extends into the interior of the filter assembly 130 with its upper end mounted to the flange member 136. A cap 204 is removably attached by fasteners 206 to the central support member 162 to thereby securely retain the annular flange 202 of the cylindrical element 200 to close the lower end of the cylindrical element 200 to define a pressure chamber 208. The cap 204 carries a sintered breather element 208 providing communication between the atmosphere and the interior of the cylindrical element 200. An electrical multi-turn coil of wire 210, commonly known as a solenoid, is disposed within the cylinder 200 adjacent the cap 204 and has a core 212 aligned with the longitudinal axis of the cylinder 200. An apertured disk 214 is mounted within the cylinder 200 adjacent the coil 210. A piston 216 is reciprocally mounted in the cylinder 200 and carries an elongated metal plunger 218 which sealingly extends through the opening in the disk 214 so that the coil 210 is fluidly separated from the midsection of the cylinder 200. The lower end of the plunger extends into the core 212 of the coil. The piston 216 carries a sealing ring 220 which seals the lower end of the cylinder 200 from the system fluid. A bore 222 extending the full length of the plunger 218 and through the piston 216 connects the chamber 208 with the atmosphere through the core 212 of the coil 210 and breather element 202. Thus one side of the piston 216 is exposed to a substantially constant pressure.

An opening 224 in the wall of the cylinder 200 provides fluid communication with the interior of the cylinder 200 and exposes the lower pressure-responsive surface of the piston 216 to the fluid pressure on the downstream side of the filter element 135. A spring 225 acts between the disk 214 and the piston 216 to bias the piston upwardly toward the cap member 136. The spring 225 has a predetermined tension to accommodate the vacuum load that can be tolerated by the pumping means in the fluid system so that as the filter element 135 becomes clogged the reduced pressure on the downstream side of the filter is reflected against the lower side of the piston 216. This creates a pressure differential across the piston so that as the fluid pressure becomes less than atmospheric pressure the piston is moved down so that the plunger 218 moves within the core 212 of the coil toward a position illustrated in phantom.

The coil 210 is connected by a pair of electrical leads 230 and 232 to a source of alternating voltage 234 and an indicating means 236. The indicating means 236 is preferably a conventional electrical meter operable to sense the magnitude of current in the circuit with a pointer element 238 that assumes a position dependent upon the magnitude of the current. The indicating means 236 has an indicator plate 240 with suitable indicia 242 thereon to reflect the filtering condition of the filter element 135.

In opeartion, assuming the filter element 135 is in a relatively clean condition, the piston 216 will be in its raised position with the plunger 218 substantially removed from the core 212 of the coil 210. As the filter element 135 becomes clogged and produces a pressure drop in the system, the reduced pressure is reflected within the cylinder against the piston 216 which acts as a pressure responsive means. As the fluid pressure is reduced to a predetermined level depending on the bias of the spring 225 and the surface areas on the opposite sides of the piston, it begins to move downwardly so that the plunger 218 moves into the core of the coil 210 and changes the permeability of the core. As is well known, the permeability of a solenoid coil depends on the material within the core with an air core being rated with a permeability of 1. The plunger 218 is formed of a magnetic material so that as it enters the core the permeability is raised to a factor greater than 1. As is also well known, when an alternating current flows through a solenoid coil, there is an opposition to the current resulting from the inductance of the coil and referred to as indictive reactance. The amount of this opposition to the current is a function of the permeability of the core so that an increase in the permeability reduces the current. Thus as the plunger 218 is moved downwardly under the changing pressure differential, the change in coil permeability causes a current drop. This current drop is reflected in a corresponding movement of the pointer 238 so that the position of the pointer 238 corresponds to the filtering condition of the filter element 135.

When the filter element has become clogged, it is separated from the system by removing the cover member 150 from the housing 110. As the filter assembly 135 is removed from within the housing member 120, the housing member 120 is moved by the spring 132 to a position stopping the fluid flow in the system to allow the user to introduce a clean filter element into the system with a minimum of fluid loss.

Having described my invention, I claim:

1. A filter device comprising:
   a housing having a filter chamber open at one end and an inlet and an outlet connected with said filter chamber;
   an inner housing member having an inner cavity, a closed end and an open end opposite said closed end, said inner housing member being disposed within said filter chamber with said open end adjacent said open end of said filter chamber;
   a plate member and means removably mounting said plate member to said housing over the open end of said chamber, said plate member having a surface adapted to be engaged by the edge of said inner housing member defining the open end thereof to act as a valve to close communication between said inlet and said outlet;
   spring means disposed intermediate the closed end of said housing and said inner housing member to urge said edge of said inner housing member against said surface of said plate member;
   said plate member having an opening and a filter element being insertable through said opening and into said inner housing member;
   a cover member for closing said opening and means removably mounted said cover member to said housing; and
   said cover member when mounted in place positioning said filter element against said inner housing member to maintain said edge away from said plate member surface to open a fluid path from said inlet and through said filter element to said outlet.

2. The filter device as defined in claim 1 and in which said filter element is cylindrical and said cover member defines an outlet passage providing communication between the interior of said filter element and said outlet.

3. The filter device as defined in claim 1 and including means disposed within said filter chamber and operable to sense the changes in the condition of said filter element and indicating means connected with said filter condition sensing means for indicating the condition of the filter element exteriorly of the housing.

4. The filter device as defined in claim 3 and in which said indicating means are electrically actuated.

5. The filter device as defined in claim 3 and including means connected with said filter condition sensing means and operable to open a bypass path around said filter element upon a predetermined condition of said filter element being sensed.

6. The filter device as defined in claim 1 and including means disposed within said filter chamber and operable to sense the changes in the condition of said filter element and means connected with said filter condition sensing means and operable to open a bypass path around said filter element upon a predetermined condition of said filter element being sensed.

7. The filter device as defined in claim 1, and in which said inner housing member has cylindrical side walls so that said edge is circular, said opening in said plate being circular and said filter element being cylindrical, the diameter of said opening being less than the diameter of said inner housing member and greater than the diameter of said filter element.

8. The filter device as defined in claim 1, and in which said cover member has an outlet passage registering with said opening in said plate member and said outlet whereby fluid flow is from said filter element through said plate member opening and through said outlet passage to said outlet.

9. A filter device comprising:
   a housing having a filter chamber open to one side and having an inlet for receiving unfiltered fluid and an outlet for the discharge of filtered fluid;
   a plate member mounted over the open side of said filter chamber and having an opening for the flow of fluid therethrough;
   an inner housing member having a greater diameter than said opening;
   means mounting said inner housing member within said filter chamber for movement between an open position wherein said inner housing member is spaced from said plate member and permits fluid to flow through said opening, and a closed position wherein said inner housing member closes said opening to stop fluid flow therethrough;
   a cover member, and means for separably mounting said cover member on said housing on the opposite side of said opening from said inner housing member;
   a filter element disposed in said filter chamber between said cover member and said inner housing member and between said inlet and said outlet whereby to permit removal of said filter element from said inner housing member, means associated with said inner housing member to cause the same to close said opening upon removal of said filter element;
   pressure responsive means disposed in said filter chamber for movement between positions corresponding to changes in the fluid pressure in said chamber as caused by changes in the porosity and thus the filtering condition of said filter element, said pressure responsive means comprising a cylinder mounted on said cover member and extending through said opening into said inner housing member, a piston reciprocally mounted in said cylinder, means connecting one side of said piston to atmospheric pressure, and means connecting the opposite side of said cylinder to the fluid pressure in said filter chamber so that a change in the fluid pressure in said filter chamber creates a pressure differential across said piston and moves said piston in said cylinder, means for indicating the position of said piston and thus the filtering condition of said filter element comprising an electrical circuit connected to a source of alternating current, an inductive coil in said electrical circuit having a core, a plunger supported for movement relative to the core of said coil between positions changing the permeability of said coil so that said coil inductively varies the magnitude of the current of said electrical circuit, means coupling said plunger to said piston so that the permeability of said coil varies with the pressure in said chamber, and means reflecting the magnitude of the current in said electrical circuit and thereby indicating the condition of said filter element.

10. The invention as defined in claim 9, wherein said plunger is carried by said piston so that movement of said piston changes the position of said plunger in the core of said coil.

11. The invention as defined in claim 9, wherein said plunger is fixedly mounted on said piston for movement along the axis of said cylinder and said coil is mounted in said cylinder with its core disposed on the axis of said cylinder for receiving said plunger.

12. The invention as defined in claim 9, wherein said cylinder is mounted in said filter chamber, said plunger is fixedly mounted on said piston for movement along the axis of said cylinder and said coil is mounted in said cylinder with its core disposed on the axis of motion of said plunger.

13. The invention as defined in claim 9, including spring bias means urging said inner housing member to engage and move said inner housing member toward its open position when said cover member is mounted on said housing and to disengage said inner housing member so that said spring bias means moves said inner housing member to its closed position when said cover member is separated from said housing.

References Cited

UNITED STATES PATENTS

| | | | |
|---|---|---|---|
| 3,323,649 | 6/1967 | Rosaen | 210—90 |
| 1,592,835 | 7/1926 | Mock et al. | 210—234 |
| 3,200,787 | 8/1965 | Darnell | 210—90 X |
| 3,283,907 | 11/1966 | Whiting | 210—234 |
| 3,326,376 | 6/1967 | Rosaen | 210—234 X |

U.S. Cl. X.R.

210—91, 234

UNITED STATES PATENT OFFICE
CERTIFICATE OF CORRECTION

Patent No. 3,507,391      Dated April 21, 1970

Inventor(s) N. O. Rosaen

It is certified that error appears in the above-identified patent and that said Letters Patent are hereby corrected as shown below:

Column 4, line 6, "opeing" should be --opening--;

Column 5, line 4, after "242" insert --calibrated--;

Column 5, line 6, "opeartion" should be --operation--;

Column 5, line 27, "indictive" should be --inductive--.

SIGNED AND SEALED
SEP 8 - 1970

(SEAL)
Attest:

Edward M. Fletcher, Jr.
Attesting Officer

WILLIAM E. SCHUYLER, JR.
Commissioner of Patents